United States Patent [19]
Hunt

[11] Patent Number: 5,613,221
[45] Date of Patent: Mar. 18, 1997

[54] RADIATION SHIELD FOR CELLULAR TELEPHONES

[75] Inventor: James R. Hunt, Cocoa, Fla.

[73] Assignee: J. R. Hunt Ventures, Cocoa, Fla.

[21] Appl. No.: 46,095

[22] Filed: Apr. 12, 1993

[51] Int. Cl.$^6$ ..................................... H04B 1/33
[52] U.S. Cl. ............................ 455/89; 455/90; 455/117; 455/128; 455/129; 379/59; 379/447; 379/437; 343/702; 343/841
[58] Field of Search ............................ 455/89, 90, 128, 455/129, 97, 117, 33.1; 379/59, 437, 447; 343/890, 891, 841, 702, 873, 718; 174/35 R, 35 MS; 542/3, 4, 2, 1, 5

[56] References Cited

U.S. PATENT DOCUMENTS

| | | | |
|---|---|---|---|
| 4,189,730 | 2/1980 | Murdock | 343/841 |
| 4,654,612 | 3/1987 | Smith | 343/890 |
| 5,335,366 | 8/1994 | Daniels | 455/89 |

FOREIGN PATENT DOCUMENTS 5992629  5/1984  Japan ..................................... 455/89

OTHER PUBLICATIONS

Toriya, Michio, "A Portable Wireless Telephone Set", a translation copy of JP 57–92629 of Toritani May 1984.
Dynaspek, "Cell Shield", Feb's 1993, 10 pages attached.

*Primary Examiner*—Reinhard J. Eisenzopf
*Assistant Examiner*—Doris To
*Attorney, Agent, or Firm*—C. A. Phillips; Joseph H. Beumer

[57] ABSTRACT

A radiation shield for a hand-held cellular telephone is made up of a metal strip placed between the antenna rod of the telephone and the speaker. The strip has a flat body portion and an upper portion that is curved away from the rod. Overall length of the strip is slightly longer than the antenna rod, and its width is 1 to 1 ½ inches. Radiation fields reaching the head of a user whose ear is placed near the speaker are substantially reduced by the shield.

7 Claims, 2 Drawing Sheets

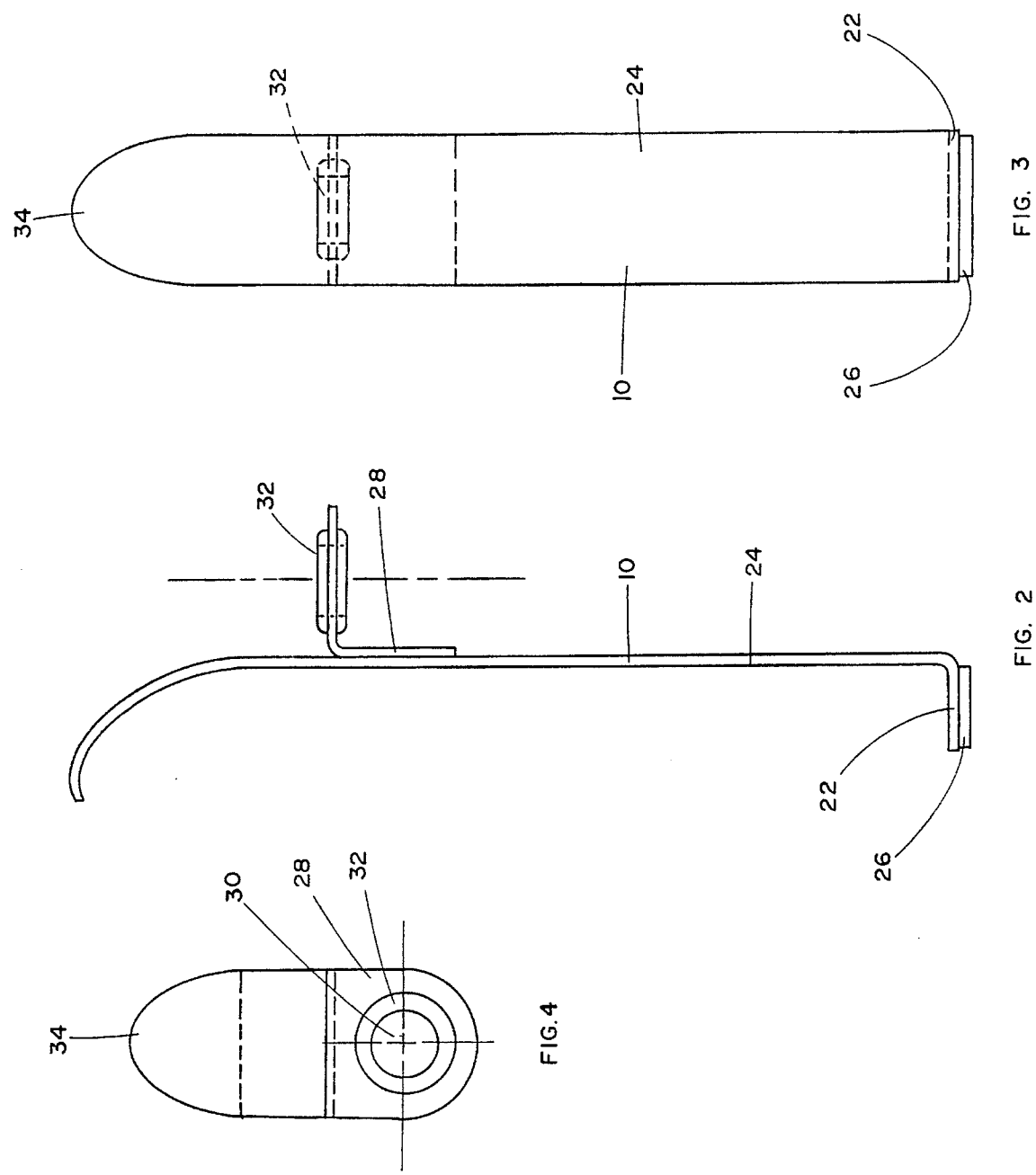

RADIATION SHIELD FOR CELLULAR TELEPHONES

FIELD OF THE INVENTION

This invention relates to cellular telephones.

BACKGROUND OF THE INVENTION

The widespread acceptance and use of hand-held, portable cellular telephones has been accompanied by increasing concern regarding possible harmful effects of radiation emitted by such devices. Hand-held cellular telephones typically have an elongated housing with a speaker located near the top of the housing and an antenna extending upward vertically from the housing. In use of this type of telephone, the user's head comes into close proximity to the antenna when his or her head is placed with an ear adjacent to the speaker. Thus, when the device is transmitting, a substantial amount of electromagnetic energy is projected directly onto the user's head at close range.

Cellular telephones generally operate in the microwave portion of the electromagnetic spectrum at a frequency of 800 to 900 megahertz. At the usual short distance between the user's head and the antenna, a substantial radiation field is generated at this microwave frequency. While the extent of biological damage that might result from exposure to such a radiation field has not been established, some indications of severely detrimental results have been publicized recently. Provision of a means for reducing the level of radiation to which a user is subjected would therefore be clearly desirable, particularly if this could be accomplished without adversely affecting the operation of the telephone.

SUMMARY OF THE INVENTION

The present invention is directed to a shield for hand-held cellular telephones which have an antenna rod extending longitudinally outward from a housing and a speaker in the housing in proximity to the antenna. The shield may take the form of an elongated, generally rectangular metal strip placed parallel to the antenna rod between the rod and the side of the housing on which the speaker is located. Dimensions and placement of the metal strip are selected to provide effective shielding, consistent with avoiding a diminution of the signal strength of the telephone and consequent interference with its operation. The strip may have a width of 1 to 1 ½ inches and a length such as to extend slightly past the top of the antenna rod, with the strip being located slightly spaced apart from the antenna, except for an outwardly-curved portion adjacent to the strip end. Attachment of the strip to the telephone may be made by adhesively joining a bent-over proximal end portion to the housing near the base of the antenna and by means of a grommet receiving the antenna and secured to the strip. In operation, the housing is oriented such that the shielded side faces the user, and the unshielded side points in the direction of the receiving antenna for the telephone system.

Shields embodying the invention provide a substantial reduction in the radiation field to which a user is exposed, up to ninety-eight percent under typical conditions. This is accomplished without interfering with operation of the telephone or reducing its range.

It is therefore an object of this invention to provide a means for decreasing the amount of electromagnetic radiation to which a user of a cellular telephone is exposed.

Another object is to provide a shield for a cellular telephone which brings about reduced radiation exposure without interfering with operation of the telephone.

Other objects and advantages of the invention will be apparent from the following detailed description.

BRIEF DESCRIPTION OF THE DRAWINGS

FIG. 2 is a side view of the shield.

FIG. 3 is a planar view of the shield of FIG. 2.

FIG. 4 is a top view.

DESCRIPTION OF THE PREFERRED EMBODIMENT

Figure 1:
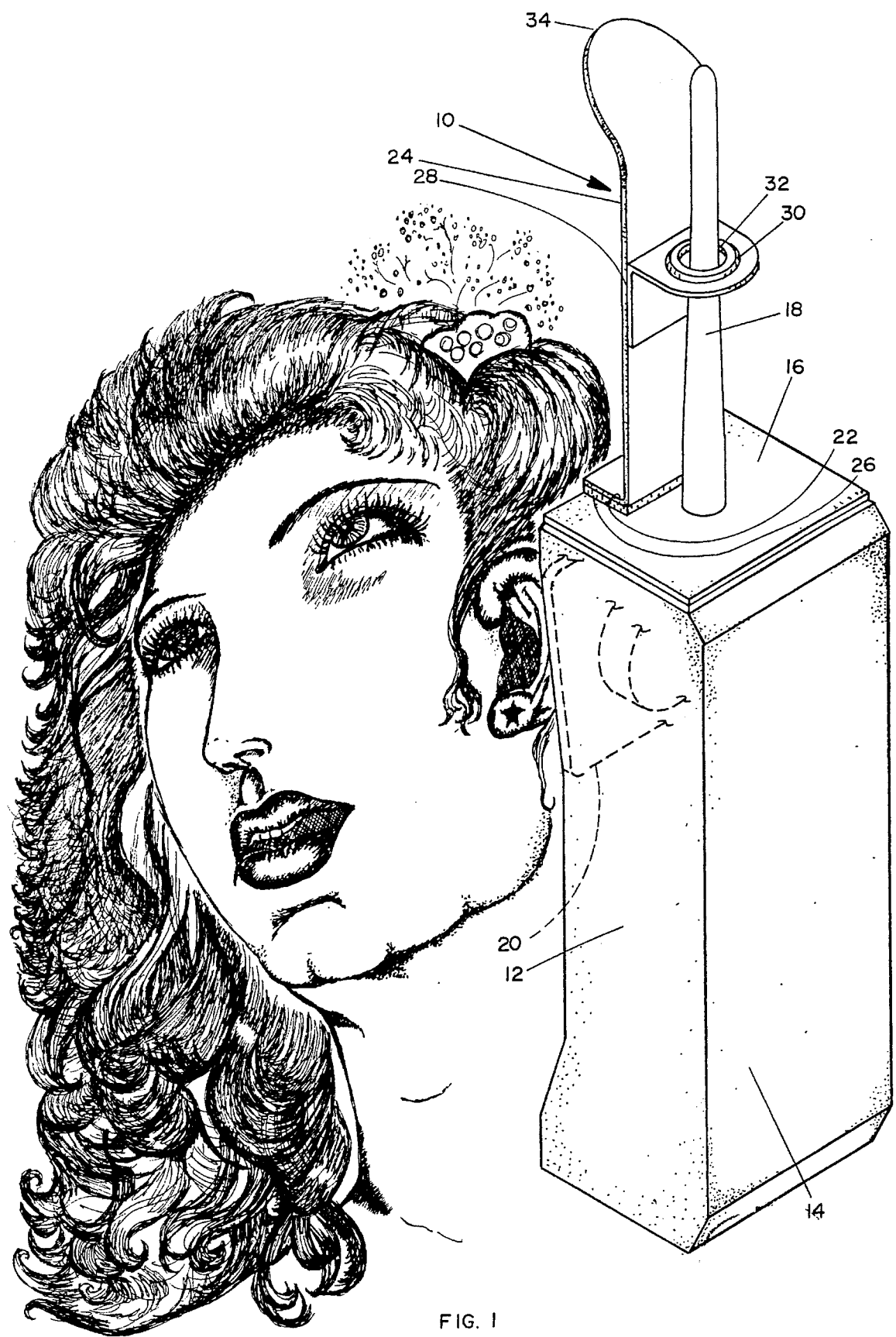
FIG. 1 is a perspective view showing a radiation shield embodying the invention installed on a cellular telephone.

Referring to FIG. 1 of the drawings, there is shown a shield 10 installed on a cellular telephone 12. The telephone has a generally rectangular elongated housing 14 including a flat upper surface 16 with antenna 18 extending longitudinally upward. The antenna is in the form of a tapered rod of reduced diameter at its distal end. A speaker 20 is located adjacent to the top of the housing on a side thereof. In operation of the telephone, the housing is held in a position such that an ear of the user is located in proximity to the speaker.

The shield has a bent-over base portion 22 perpendicular to its body portion 24, the base portion being located away from the antenna and secured to housing surface 16 by means of an adhesive 26. An L-shaped bracket 28 is secured to the inner face of the shield at a location past the middle of the shield length, the bracket having seated in aperture 30 thereof a grommet 32. The grommet, preferably made of insulating material such as rubber or plastic, is disposed to receive the antenna and serves to keep the shield spaced apart from the antenna.

The shield at its distal end 34 is preferably rounded off and is curved outwardly from the plane of body portion 24 over approximately the last 20 to 25 percent of the shield length. Although not critical to the invention, this curvature of the shield enables more effective reflection of transmitted radiation away from the head of the user and reduces the possibility of interference with incoming signals.

The embodiment in the drawings is shown installed on a Motorola Model No. 8000 Hand-held Cellular Telephone. The antenna for this telephone has a length of 8 inches, with the shield being given a length of 6 ¾ inches, up to the beginning of curvature and 2 inches from that point to the outer end and a width of 1 ⅛ inches. The body portion of the shield is spaced part from the antenna a distance of ⅜ inch at the base of the antenna and greater amounts at the inwardly tapered upper portion of the antenna. An average spacing of ⅜ to ½ inch is preferred. Although other metals may also be used, aluminum is the preferred material for the shield. A thickness of 0.040 inch may be used to provide sufficient rigidity to remain in position, consistent with effective shielding.

The invention is described above in terms of a specific embodiment. It is to be understood, however, that changes and modifications may be made without departing from the spirit and scope of the invention, which is limited only as indicated by the appended claims.

What is claimed is:

1. A radiation shield for a cellular telephone having an elongated housing, an antenna rod extending longitudinally outward from said housing, and a speaker in the housing in proximity to the antenna rod, said shield comprising:

a metal strip connected to said housing and disposed between said antenna rod and a user whereby the amount of radiation emitted by said antenna rod and reaching a region adjacent to the speaker will be substantially reduced, said strip having a flat body portion adapted to be placed generally parallel to said antenna, said strip having an overall length at least slightly longer than the antenna rod, and wherein said flat body portion extends over one-half way to a distal end of the strip, said strip includes an outwardly curved end portion, and cross sections defined by said end portion transverse to said flat body portion are linear.

2. A radiation shield as defined in claim 1 wherein the flat body portion of the strip is spaced apart from the antenna rod an average distance of 3/8 to 1/2 inch.

3. A radiation shield as defined in claim 2 wherein said strip is generally rectangular and has a width of 1 to 1 1/2 inches.

4. A radiation shield as defined in claim 3 wherein the flat body portion of said strip comprises 75 to 80 percent of the overall length thereof.

5. A radiation shield as defined in claim 1 including an L-shaped bracket connected to said flat body portion of said strip and supporting an insulating grommet for receiving said antenna rod so as to maintain said strip in spaced-apart relation to said antenna rod.

6. A radiation shield as defined in claim 5 wherein said strip has a proximal end portion bent over at a right angle to the body portion and adhesively bonded to said housing.

7. A radiation shield for a cellular telephone having an elongated housing, an antenna rod extending longitudinally outward from said housing, and a speaker located adjacent to a first side of said housing, said shield comprising:

a metal strip connectable to said housing in a location between said first side and said antenna whereby a user adjacent to said first side is shielded from radiation emitted by said antenna, and a second side opposite to said first side remains unshielded so that interference with reception of signals may be avoided;

said strip comprising a flat body portion adapted to be placed generally parallel to said antenna, and said strip having an overall length at least slightly longer than the antenna rod;

said strip is located so as to provide a shielded zone extending radially outward from said strip along the length thereof and an unshielded zone along the length of said antenna opposite to said shielded zone;

said flat body portion of said strip comprises 75% to 80% of the overall length thereof and adjacent to said housing; and said strip is curved outward toward said first side of said housing over 20% to 25% of the length of the strip.

* * * * *